United States Patent [19]

Hilton

[11] 4,337,393

[45] Jun. 29, 1982

[54] CASSETTE FOR BANKNOTES

[75] Inventor: Graham H. Hilton, Lovedean, England

[73] Assignee: De La Rue Systems Limited, London, England

[21] Appl. No.: 100,635

[22] Filed: Dec. 5, 1979

[30] Foreign Application Priority Data

Dec. 8, 1978 [GB] United Kingdom ............... 47670/78

[51] Int. Cl.[3] .......................... G05B 1/00; G06K 5/00; G06G 7/04

[52] U.S. Cl. .................................... 235/487; 235/385; 235/493

[58] Field of Search ........................ 235/385, 493, 487; 194/4 R; 340/146, 3 Y

[56] References Cited

U.S. PATENT DOCUMENTS 3,227,886 1/1966 Dunigan ........................ 235/493 X
3,643,065 2/1972 Dunigan ........................ 235/493 X

FOREIGN PATENT DOCUMENTS 1034395 6/1966 United Kingdom .
1078268 8/1967 United Kingdom .
1313226 4/1973 United Kingdom .
1326344 8/1973 United Kingdom .
1371005 10/1974 United Kingdom .
1406343 9/1975 United Kingdom .

*Primary Examiner*—Harold I. Pitts
*Attorney, Agent, or Firm*—Frost & Jacobs

[57] ABSTRACT

The invention relates to cassettes adapted to contain stacks of banknotes particularly for use with banknote handling apparatus.

An object of the invention is to provide a cassette which has identification means to enable the apparatus to recognize a particular denomination of banknotes contained in the cassette.

In the drawing (FIG. 1) the cassette has a device 9 on the side of the casing panel 3 to identify the denomination of the banknotes contained in the cassette. The device 9 is encoded to enable an associated sensing means mounted on the handling machine to interpret the encoded information. The encoding device may be for example, magnetic or mechanical, or it may be electromechanical. The specification describes a number of different examples of coding devices including binary devices using magnets, LED devices etc.

4 Claims, 6 Drawing Figures

CASSETTE FOR BANKNOTES

BACKGROUND OF THE INVENTION

This invention relates to cassettes, adapted to contain stacks of banknotes, for use with banknotes handling apparatus. More specifically it relates to identification means for such cassettes to enable the apparatus to recognise a particular denomination of the banknotes contained in a cassette.

Whilst the invention has special utility in connection with multi-denomination banknote dispensers it may also be employed with dispensers and loading machines intended to handle banknotes of a single denomination.

By means of the present invention it is possible to enhance the versitility and flexibility of a multidenomination banknotes dispenser by enabling any one of its sub-sections to deal with any denomination. For example, a known dispenser capable of dispensing £ 1, £ 5 and £ 10 will normally have three special-purpose feeders to which cassettes of the respective denomination must be fitted. However, if a feeder unit is capable of recognising the denomination of the banknotes contained in a cassette presented to it, it follows that the cassettes may be fitted in a random manner and furthermore that the dispenser may be readily adapted to perform special functions. For example, to cater for an abnormal demand for £ 1 banknotes the apparatus may be fitted with three cassettes containing £ 1 denomination banknotes thereby to enable it to operate for long periods without replenishment. Furthermore, in the eventuality of mechanical failure of a feeder it is also possible to substitute a cassette of a different denomination. For example, if the £ 1 feeder failed in the above mentioned three-denomination dispenser it would be possible for a cashier to substitute a £ 1 cassette for the £ 10 cassette thereby to avert a total break-down of the apparatus.

BRIEF SUMMARY OF THE INVENTION

According to the broadest aspect of the invention a cassette for use with banknote handling apparatus comprises:

(a) a casing adapted to house a stack of banknotes;

(b) an apparatus to permit transmission of banknotes into or out of the casing;

(c) a machine-readable identification means adapted to influence switching means associated with said apparatus and capable of being pre-programmed to indicate the denomination of the banknotes contained in or to be inserted into, the cassette.

The cassette preferably includes a stack support within the casing and a movable pressure plate adapted to exert a force against the end face of a stack remote from said apparatus.

In its most basic form the said identification means may comprise one or more switch striking means disposed in a predetermined formation and adapted to actuate one or more associated electrical switches fixedly mounted to the dispenser, when the cassette is inserted in its operative position.

In another embodiment, the said identification means may comprise a predetermined array of magnets which are adapted to influence one or more magnetic switches (for example, reed-switches) which may be disposed on the dispenser.

In a further embodiment the said identification means may employ a coded array of optical devices. For example, it may comprise an assembly of light-emitting-diodes which are selectively energised to influence one or more sensors disposed on the dispenser. Alternatively, it may comprise a means for forming a particular combination of light paths between a source of radiation and one or more receivers associated with the dispenser. The latter embodiment may entail the use of fibre-optics or light pipes disposed in an arrangement which is unique to the particular denomination contained in the cassette. In all cases however it is preferable that the precise coding of the identification means is not readily discernible by human interpretation thereby to provide security, during transportation and subsequent use of the cassette.

Preferably the said identification means is programmed to provide encoded information, which may for example be in binary form, to the handling apparatus thereby to enable automatic routing of monetary values and other statistical information to be effected.

Preferably the said identification means is contained in a unitary removable block disposed on an external surface of the casing of the cassette. To prevent unauthorised removal of substitution of a block by another of different value, for fraudulent purposes, the said block is secured by attachment means which are only accessible from the interior of the cassette.

BRIEF DESCRIPTION OF THE DRAWINGS

Three non-limiting examples of the invention will now be described with reference to the accompanying drawings of which

DETAILED DESCRIPTION

Figure 1:
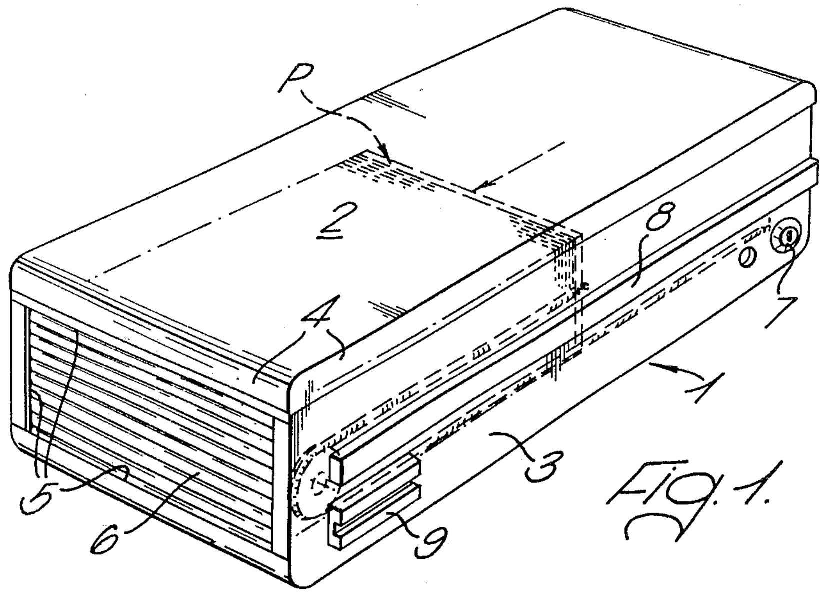
FIG. 1 is a perspective view of a cassette incorporating an encoded magnetic identification means.

In FIG. 1 is shown a cassette adapted to house banknotes comprising a substantially rectangular box-like casing having a base portion 1 and a lid 2. The base portion comprises a sheet metal base panel to which is attached a rear panel and two side panels, one of which is indiciated by symbol 3. The lid, which is hinged to the rear of the casing, is provided with a downwardly directed peripheral flange 4 to encompass the upper extremities of the panels thereby to promote the necessary security to the assembly. The front of the cassette is provided with a rectangular aperture 5 through which banknotes may be removed by a dispenser (or conversely may be introduced, in the case of a loading machine). The aperture is normally sealed by means of a slatted-type shutter 6 which is capable of retraction in a downward, and then in a rearward direction, within suitable guideways when the cassette is effectively positioned within an associated handling machine. A key-operated lock 7 is provided at the side of the casing to secure the lid and the shutter in their closed positions, as shown. Guide strips 8 are fixedly mounted to the side panels to locate and support the cassette within complementary guideways provided in the handling machine. The banknotes are stacked on-edge within the casing upon a horizontal support surface and a spring-biassed pressure plate P means is provided to engage the rear face of the stack and force the front face thereof towards the aperture 5.

A denomination-indicative device 9 (various embodiments of which are described below) is provided on the casing panel 3 to identify the denomination of the banknotes contained in the cassette. The said device is encoded in a particular manner to enable an associated sensing means, mounted on the handling machine, to interpret the encoded information.

Figure 2:
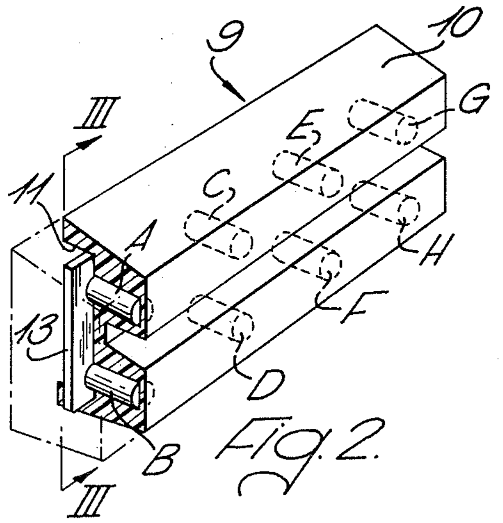
FIG. 2 is a partly sectioned perspective view of the identification means included in FIG. 1, drawn to a larger scale.
Figure 3:
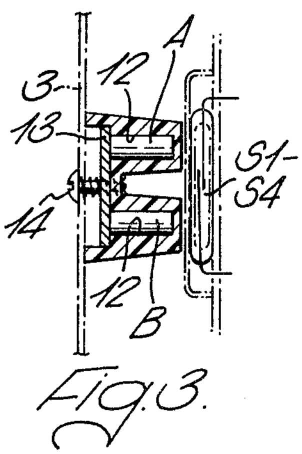
FIG. 3 is a vertical cross-section along the plane III—III of FIG. 2 together with an electrical switch associated with a banknote dispenser.

In FIGS. 2 and 3, the device 9 comprises a moulded block 10 of plastics material having an approximately rectangular configuration and which includes a rear cavity 11 leading to eight cylindrical pockets 12, which are adapted to receive eight cylindrical permanent magnets labelled A to H.

Two aligned rows of four pockets and magnets are provided, which effectively define four discrete switch-operating stages. Each vertically disposed pair of magnets is magnetically connected together by means of a ferrous keeper plate 13 which is accommodated in the cavity 11. The block 10 is secured to the external face of the panel 3 by screws 14 (see FIG. 3). Access to the screw heads is only attainable from the interior of the cassette and accordingly it is not possible for the blocks to be removed for fraudulent purposes. Furthermore, the number and location of the magnets is not visually discernible because of the planar outer surface of the block.

The switching means, which may, for example, be mounted on the dispenser, comprises four vertically disposed reed-switches S1 to S4 which are aligned opposite to the magnet pairs A/B,C/D,E/F and G/H when the cassette is fully inserted in its operative position. In FIG. 3 the reed-switch S1 is shown in alignment with magnets A and B.

The encoding of the device is effected by the disposition of the magnets within their respective pockets. For example, if it is desired to close the reed-switch S1, the north pole of magnet A and the south pole of magnet B are sited towards the reed-switch. Conversely, like poles will not close the switch. Thus, by the use of four discrete switching devices the machine-identification of £ 1, £ 5, £ 10 and £ 20 denomination cassettes may be effected, and upon closure of a particular switch the control logic of the dispenser may be modified automatically. To permit a higher number of identifications to be effected, binary notation may be applied to the switching. For example, three switches and three associated pairs of magnets may be arranged to provide seven binary combinations.

Two further embodiments of the invention entailing the use of optical devices will now be described.

Figure 4:
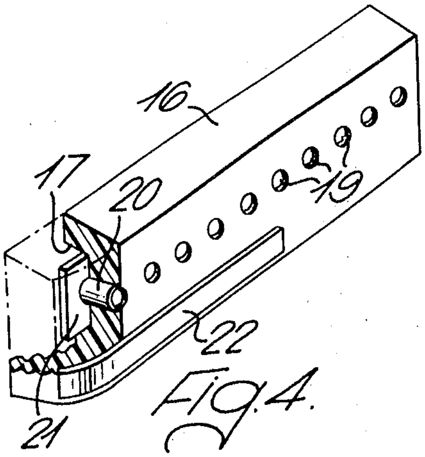
FIGS. 4 and 5 depict an identification means of an optical type.
Figure 5:
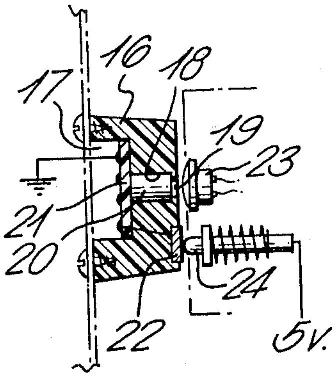

The device shown in FIGS. 4 and 5 comprises a block 16 of plastics material having a rear cavity 17 and an array of cylindrical bores 18 having terminal portions 19 of reduced diameter. Disposed within the bores 18 there is provided an array of L.E.D. devices 20 which are mounted upon a common printed circuit board 21 contained within the cavity 17. The LED's are effectively connected in parallel arrangement, viz to a common earth on one side and to a current collecting strip 22, disposed on the frontal face of the block, on the other side. The switch means mounted on the dispenser comprises an array of photo-electric sensors (one of which is indicated by symbol 23). To establish a current source for the LED's in the block a spring-biassed contact 24 is provided below the sensors 23. This is in circuit with a 5-volt supply and engages the current collecting strip 22 in the manner shown thereby to energise the LED's. Encoding of the device is effected by severence of certain conductors of the printed circuit board so that predetermined LED's are operative for a particular denomination of currency.

Figure 6:
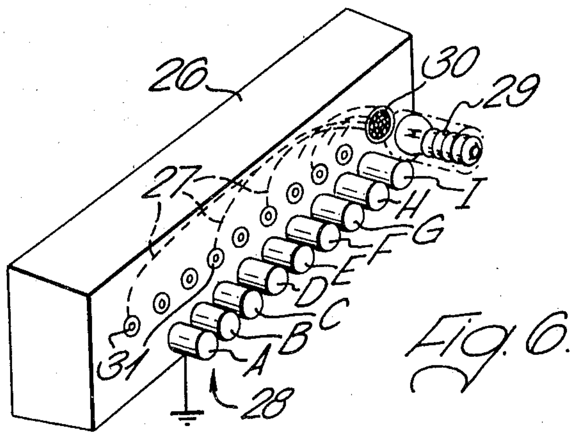
FIG. 6 is a perspective view of an alternative optical type of identification means.

The second optical device is illustrated in FIG. 6 and which comprises a block 26 incorporating a predetermined arrangement of light guides 27. The device includes nine switching stages and associated photo-electric detectors 28 mounted on the dispenser. Also mounted on the dispenser is a source of illumination 29 which illuminates one end 30 of the array of light guides. Encoding is effected by positioning the opposite ends of certain of the light guides within a predetermined selection of bores 31 formed in the planar surface of the block thereby to direct light to respective predetermined detectors. In the illustrated example, light from the source 29 will be directed to influence detectors A,D,F and H via the light guides disposed within the block 26. In a practical construction the block comprises a hollow plastics moulding and, after positioning the light guides, the interior of the block is filled with a synthetic resin thereby to encapsulate the assembly.

The particular control mechanism adapted for use in conjunction with the switching means of the dispenser may be of a variety of kinds in accordance with its intended duty. For example, in the case of a multi-denomination cash dispenser each of its sub-sections or modules will be provided with an identical array of switching devices connected electrically with the control logic for the overall operation of the apparatus. For example, such a control may comprise a pre-programmed micro-processor adapted:

(a) to receive and store input information indicative of monetary requirements of a customer with respect to value and required denomination;

(b) to scan the state of each of the said arrays of switches thereby to establish which of the denominations are available in each of the respective modules;

(c) to programme a sequence controller to dispense from each of the respective modules banknotes to the required value in a sequential manner;

(d) to receive count pulses from a counter unit provided in the delivery flow-line from the modules and to decrement the stored values until zero values are contained, and thereafter to arrest operation of the apparatus.

It thus follows that because the control logic is capable of ascertaining which of the denominations is contained in the cassette associated with each module it may readily be programmed to cater for certain abnormal conditions of operation. For example, upon the failure to feed from a cassette containing £ 5 denomination banknotes the outstanding monetary value may be dispensed from the £ 1 denomination cassette to avoid a breakdown of the apparatus.

When the cassette is used in a banknote-loading machine the said machine-readable information means may be arranged to actuate a switch array of the above mentioned type thereby to ensure that the cassette is correctly integrated with the loading operation with reference to the handling of particular denominations.

Whilst the above described examples show the denomination-indicative device as a discrete block it may alternatively be incorporated within the boundary of the case, or within the guide strips 8.

It will be obvious that the above described embodiments of the invention may also serve to provide a "cassette present" signal thereby to inhibit operation of a dispenser if a particular cassette is not correctly positioned in a multi-denomination dispenser.

I claim:

1. A cassette, for use with banknote handling apparatus, comprising:

(a) a casing adapted to house a stack of banknotes;

(b) an aperture in said casing to permit transmission of banknotes into and out of the casing; and (c) machine-readable identification means capable of being pre-programmed to indicate the denomination of the banknotes contained in the cassette, said means comprising a predetermined array of magnets which are adapted to influence at least one magnetic switch associated with said apparatus when said cassette is operatively associated therewith.

2. A cassette according to claim 1 in which the magnets in said array are selectively positioned to provide encoded information indicative of the denomination of the banknotes contained in the cassette.

3. A cassette according to claim 2 in which said magnets are contained in a unitary removable block disposed on an external surface of the casing of the cassette and secured by attachment means which are only accessible from the interior of the cassette.

4. A cassette according to claim 3 in which said block comprises a plurality of concealed pockets, each said pocket being adapted to receive a magnet.

* * * * *